United States Patent

Garman et al.

[11] 3,897,693
[45] Aug. 5, 1975

[54] COUPLING DEVICE FOR GOVERNOR CONTROL

[75] Inventors: Ronald H. Garman, Pekin; John P. Mackoway, Jr., East Peoria, both of Ill.

[73] Assignee: Caterpillar Tractor Co., Peoria, Ill.

[22] Filed: May 29, 1973

[21] Appl. No.: 364,940

[52] U.S. Cl.............. 74/491; 29/455 R; 74/548; 74/606 R; 123/98; 123/198 E; 181/33 K; 403/260; 403/356
[51] Int. Cl.²..  G05G 7/00; F02D 11/02; E04B 1/99
[58] Field of Search.......... 74/491, 606 R, 548, 523, 74/524, 545, 546; 181/33 K; 403/258, 259, 260, 356; 220/9 F; 29/455 R; 123/98, 198 E

[56] References Cited
UNITED STATES PATENTS

| 389,631 | 9/1888 | Baltzley | 74/548 X |
|---|---|---|---|
| 1,398,263 | 11/1921 | Hale | 74/548 |
| 1,582,189 | 4/1926 | Nicholson | 74/548 X |
| 2,062,108 | 11/1936 | Rickerson | 74/548 X |
| 2,140,842 | 12/1938 | Madsen | 74/548 |
| 2,886,721 | 5/1959 | Picozzi et al | 417/312 X |
| 2,940,330 | 6/1960 | Parsons | 74/491 X |
| 3,117,465 | 1/1964 | Eiermann | 192/.096 X |
| 3,315,540 | 4/1967 | Baumgartner | 74/548 |
| 3,319,482 | 5/1967 | Campbell et al | 74/606 X |
| 3,789,954 | 2/1974 | Raleigh | 181/33 K |

*Primary Examiner*—Allan D. Herrmann
*Attorney, Agent, or Firm*—Phillips, Moore, Weissenberger Lempio & Strabala

[57] ABSTRACT

A governor control mechanism includes a shaft rotatably mounted in a casing, and to which is connected linkage means for controlling a governor upon rotation of the shaft. A control lever is situated outside the casing and is connected to the shaft by means which are removable, along with the control lever, to allow a sound-suppressive casing to be installed about the first-mentioned casing without removal of the shaft.

6 Claims, 4 Drawing Figures

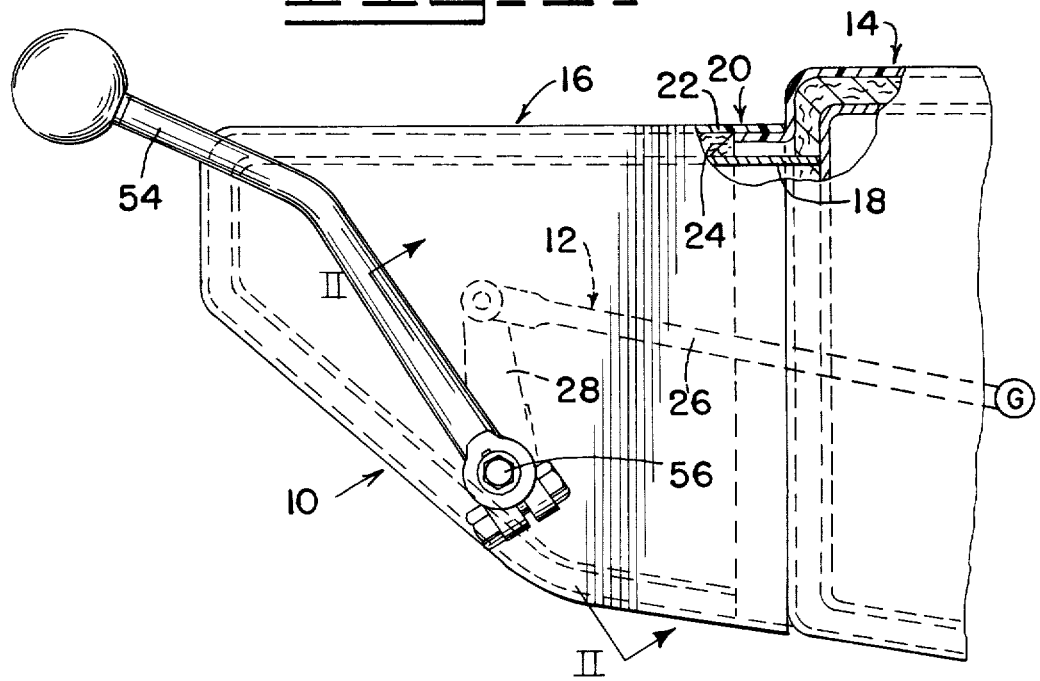
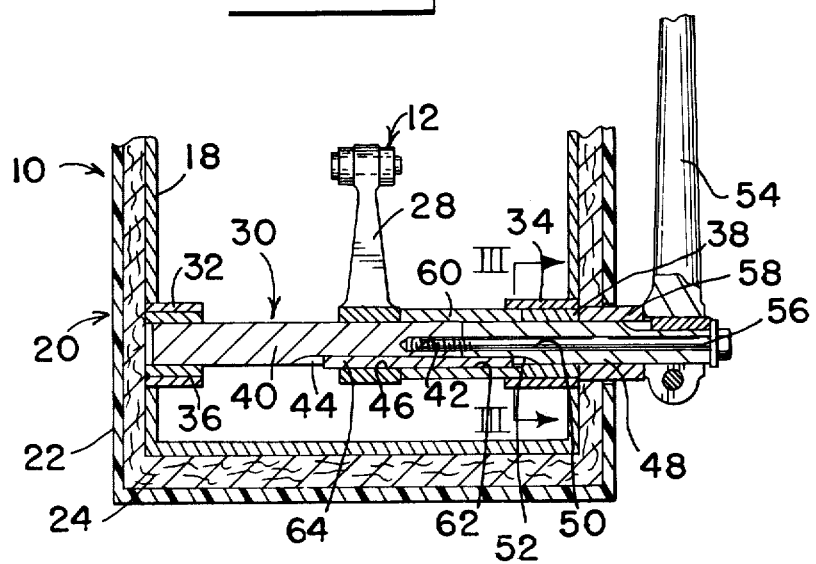

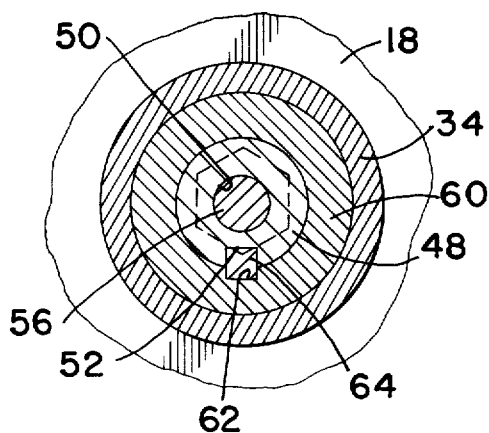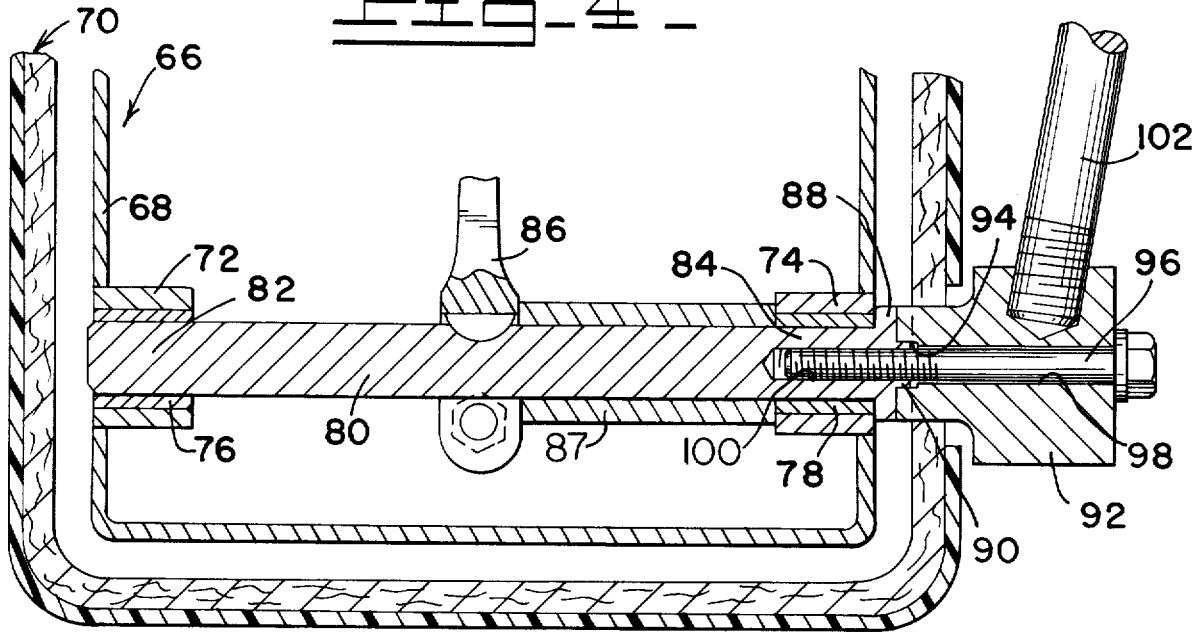

COUPLING DEVICE FOR GOVERNOR CONTROL

BACKGROUND OF THE INVENTION

This invention relates to governor control mechanisms, and more particularly, to such a mechanism which permits the flush removal of a hand control lever from an operator control console of a vehicle to facilitate the installation of a sound-suppressive cover over the control console.

The attachment of a sound-suppressive cover over The control console of a vehicle generally involves some difficulty. Generally, the control console includes a protruding shaft on which is mounted a hand control lever for the engine governor. Because of such protruding shaft, simple removal the the hand control lever from the end of the shaft is insufficient to permit the installation of the cover, which generally fits relatively closely to and over the console. It should be understood that any method of facilitating the installation of the sound-suppressive cover over the console that would provide a passage permitting sound to infiltrate the cover is highly undesirable because of the detrimental effect on silencing capability of the cover caused thereby. Consequently, it has been found that, in order to install the cover, the shaft would also have to be removed.

However, the removal of the shaft is also highly undesirable due to the likelihood of throwing the governor control linkage out of adjustment, which would interfere with the proper functioning of the engine governor. It will be understood that precise adjustments to the governor control linkage have been made on the assembly line prior to the attachment of the sound-suppressive cover, which takes place after the vehicle has left the assembly line. The precise adjustments are preferably made on the assembly line because of greater accessibility to the governor control linkage and associated elements.

SUMMARY OF THE INVENTION

It is the object of this invention to provide a governor control mechanism associated with a control console, which allows tha application of a sound-suppressive cover over the control console while avoiding alteration of the state of adjustment of the governor control linkage and associated structure.

Broadly stated, the invention disclosed herein is a mechanism for controlling an engine governor. The mechanism comprises the first casing, and shaft means rotatably supported in the first casing. Means interconnect the shaft means and governor so that the governor is responsive to movement of the shaft means. A second casing is positionable about the first casing, and a control lever is positioned outward of the first casing. Means interconnect the control lever with the shaft means, meanwhile allowing disconnection of the control lever from the shaft means, so that upon disconnection of the control lever from the shaft means, the second casing may be positioned about the first casing freely and without interference from the shaft means, and so that, upon interconnection of the control lever with the shaft means, the control lever is outward of the first and second casings.

BRIEF DESCRIPTION OF THE DRAWINGS

These and other objects of the invention will become apparent from a study of the following specification and drawings, in which:

FIG. 1 is a side elevation of a control console incorporating the invention;

FIG. 2 is a sectional view taken along the line II—II of FIG. 1;

FIG. 3 is a sectional view taken along the line III—III of FIG. 2; and

FIG. 4 is a sectional view similar to that shown in FIG. 2, but showing a second embodiment of the invention.

DESCRIPTION OF THE PREFERRED EMBODIMENTS

Referring to FIGS. 1–3 of the drawings, a detachable coupling device 10 is shown in association with a linkage partially shown at 12 for controlling an engine governor $g$. The linkage 12 extends from the governor to a vehicle partially shown at 14, and into a control console 16.

On a standard vehicle, the control console 16 is a fabricated sheet metal casing as indicated at 18. As an attachment, a sound-suppressive casing 20 is positionable about the casing 18 for alleviating noise generated by the engine. The casing 20 includes a formed hard plastic outer cover 22 having an inner lining 24 of sound-suppressive material such as polyurethane foam.

The linkage 12 includes a control rod 26 having an end pivotally connected to one end of a lever 28. The other end of the lever 28 is mounted upon shaft means 30. Shaft means 30 are rotatably supported in the casing 18, bhy means which will now be described.

A pair of inwardly extending cylindrical bosses 32, 34 are mounted in aligned aperture formed opposite walls of the casing 18. A pair of sleeve bearings 36, 38 are individually mounted within the bosses 32, 34 respectively. The shaft means 30 include a shaft 40 which has one end rotatably mounted in sleeve bearing 36. The other end of the shaft 40 is provided with an axial threaded bore 42 and an external keyway 44 formed thereon. The lever 28 includes an internal keyway 46 formed thereon.

An interconnecting member 48 is extended through and rotatably mounted by the sleeve bearing 38 in the boss 34. The interconnecting member 48 is provided with an axial bore 50 formed therethrough. The inner end of the interconnecting member 48 is disposed in abutting relation to the inner end of the shaft 40 and includes an external keyway 52 formed therein. A hand control lever 54 is keyed to the outer end of the interconnecting member 48, outwardly of the casing 18, for rotational movement therewith. An elongated bolt 56 is disposed through the axial bore 50 from the outer end of the interconnecting member 48, and is screw threadably engaged with the threaded bore 42 of the shaft 40 for securing the shaft 40 and interconnecting member 48 together.

A cylindrical spacer 58 is disposed between the hand control lever 54 and the boss 34 for the proper axial disposition thereof. A cylindrical member 60 extends between the lever 28 and the sleeve bearing 38 and includes an internal keyway 62 formed therein. The outer end of the cylindrical member 60 is partially extended into the boss 34 for radial support therein. A key 64 is dispose in keyways 46, 44, 52 and 62 on the lever 28, shaft 40, interconnecting member 48, and the cylindrical member 60, respectively, so that such parts are collectively rotationally coupled together, so that the governor is responsive to movement of the shaft means 30 by means of movement of the control lever 54.

In the embodiment shown in FIGS 1–3, the installation of the sound-suppressive casing 20 over the sheet metal casing 18 is accomplished by disconnecting the hand control lever 54, the interconnecting member 48, and the spacer 58, by the removal of the bolt 56. The disassembly of such parts is accomplished without disturbing the remaining portion of the linkage mechanism 12 and the side of the enclosure is left free of any protrusion which would interfere with the sliding of a sound-suppressive casing 20 over the casing 18. Thus, the casing 20 may be positioned about the casing 18 freely and without interference from shaft means 30, and after such positioning, and the reassembly of the associated structure, the control lever 54 is outward of the casings 18 and 20.

In this embodiment, with the interconnecting member 48 in place as shown in FIGS. 1–3, and the casing 20 so positioned about the casing 18, the interconnecting member 48 is disposed through a wall of the casing 20 and also a wall of the casing 18.

An alternate embodiment of the present invention is shown in FIG. 4, wherein a control console 66 includes sheet metal casing 68 and a sound-suppressive casing 70 which is disposed in spaced relation around the sheet metal casing 68 to provide an air space therebetween to further facilitate the attenuation of noise.

A pair of cylindrical bosses 72 and 74 having sleeve bearings 76 and 78 respectively mounted therein are mounted in axially aligned apertures formed through the opposite sides of the casing 68. A shaft 80 has opposite ends 82 and 84 rotatably mounted by the sleeve bearings 76 and 78 respectively. A lever 86 interposed the ends 82, 84 is keyed to shaft 80 for rotational movement therewith. A cylindrical spacer 87 is disposed between the lever 86 and the boss 74 to maintain the proper axial disposition of the shaft 80. The end 84 of the shaft 80 is provided with a flange 88 abutting the outer end of boss 74. The end 84 is also provided with an axially protruding tongue 90 extending traversely thereacross. A lever mounting interconnecting member 92 has one end provided with a mating groove 94 for receiving the tongue 90 therein for rotatably coupling the shaft 80 and the interconnecting member 92 together. A bolt 96 is disposed through an axial bore 98 formed through the interconnecting member 92 and threadably engaged with a threaded bore 100 formed in the end of the shaft 80. A hand control lever, partially shown at 102, is screw-threadably attached to the interconnecting member 92.

In the embodiment of FIG. 4, the removal of bolt 96 permits the removal of the interconnecting member 92 and the lever 102 to provide sufficient clearance for the installation of the sound-suppressive casing 70 over the sheet, metals casing 68.

In this embodiment, with the interconnecting member 92 in place as shown in FIG. 4, with the casing 70 so positioned about the casing 68, the interconnecting member 92 is disposed through only a wall of the casing 70.

What is claimed is:

1. A mechanism for controlling an engine apparatus comprising: a first casing; shaft means rotatably supported in the first casing; means interconnecting the shaft means and engine apparatus so that the engine apparatus is responsive to movement of the shaft means; a second casing positionable about the first casing; a control lever positioned outward of the first casing; and means interconnecting the control lever with the shaft means, meanwhile allowing disconnection of the control lever from the shaft means so that, upon disconnection of the control lever from the shaft means, the second casing may be positioned about the first casing freely and without interference from the shaft means, and so that, upon innterconnection of the control lever with the shaft means, the control lever is outward of the first and second casings; wherein the means interconnecting the control lever with the shaft means comprise a removable member interconnecting the control lever and the shaft means, wherein, with the interconnecting member interconnecting the shaft means and the control lever, and with the second casing so positioned about the first casing, the interconnecting member is disposed through a wall of the first casing and a wall of the second casing.

2. The mechanism of claim 1 wherein the engine apparatus controlled comprises an engine governor.

3. The control mechanism of claim 1 and further comprising key means for associating the shaft means and interconnecting member for providing that the shaft means and interconnecting member rotate together.

4. The control mechanism of claim 3 and further comprising additional key means for associating the control lever and interconnecting member for providing that the control lever and interconnecting member rotate together.

5. The control mechanism of claim 1 and further comprising tongue-and-groove means for associating the shaft means and interconnecting member for providing that the shaft means and interconnecting member rotate together.

6. The control mechanism of claim 5 and further comprising threaded means for associating the control lever and interconnecting member for providing that the control lever and interconnecting member rotate together.

* * * * *